United States Patent [19]

Baker et al.

[11] Patent Number: 4,805,219
[45] Date of Patent: Feb. 14, 1989

[54] METHOD FOR SPEECH RECOGNITION

[75] Inventors: James K. Baker, West Newton; Laurence Gillick, Newton, both of Mass.

[73] Assignee: Dragon Systems, Inc., Newton, Mass.

[21] Appl. No.: 35,628

[22] Filed: Apr. 3, 1987

[51] Int. Cl.[4] .................................................. G10L 5/00
[52] U.S. Cl. ...................................... 381/43; 364/513.5
[58] Field of Search ............................. 381/41, 43, 45; 364/513.5

[56] References Cited

U.S. PATENT DOCUMENTS

| | | | |
|---|---|---|---|
| 4,348,553 | 9/1982 | Baker et al. | 364/513.5 |
| 4,454,586 | 6/1984 | Pirz et al. | 381/41 |
| 4,624,008 | 11/1986 | Vensko | 381/43 |
| 4,718,095 | 1/1988 | Asakawa et al. | 381/43 |

OTHER PUBLICATIONS

"Organization of Hearsay II Speech Understanding System", Lesser et al., IEEE Trans. Acoust., Speech & Signal Process, vol. ASSP-23, 2/75.
"Motivation and Overview of Speechlis", W. Woods, IEEE Trans. Acoust., Speech and Signal Process, vol. ASSP-23, pp. 2–10, May 75.
"The HWIM Speech Understanding System", Wolf et al., IEEE Internat. Conf. Record on Acoust. Speech and Signal Process, pp. 784–787, 789, 5/9–11/87.
"A Two Stage Isolated Word Recognition System Using Discriminant Analysis", Martin, Masters Thesis, MIT, 6/86, Chpt. 4, pp. 23–36.
"Stocahstic Modeling For Automatic Speech Understanding", Baker, pp. 522–542, Speech Recognition, Academic Press 1975.

*Primary Examiner*—Bernard Roskoski
*Attorney, Agent, or Firm*—Edward W. Porter

[57] ABSTRACT

A method determines if a portion of speech corresponds to a speech pattern by time aligning both the speech and a plurality of speech pattern models against a common time-aligning model. This compensates for speech variation between the speech and the pattern models. The method then compares the resulting time-aligned speech model against the resulting time-aligned pattern models to determine which of the patterns most probably corresponds to the speech. Preferably there are a plurality of time-aligning models, each representing a group of somewhat similar sound sequences which occur in different words. Each of these time-aligning models is scored for similarity against a portion of speech, and the time-aligned speech model and time-aligned pattern models produced by time alignment with the best scoring time-aligning model are compared to determine the likelihood that each speech pattern corresponds to the portion of speech. This is performed for each successive portion of speech. When a portion of speech appears to correspond to a given speech pattern model, a range of likely start times is calculated for the vocabulary word associated with that model, and a word score is calculated to indicate the likelihood of that word starting in that range. The method uses a more computationally intensive comparison between the speech and selected vocabulary words, so as to more accurately determine which words correspond with which portions of the speech. When this more intensive comparison indicates the ending of a word at a given point in the speech, the method selects the best scoring vocabulary words whose range of start times overlaps that ending time, and performs the computationally intensive comparison on those selected words starting at that point in the speech.

20 Claims, 11 Drawing Sheets

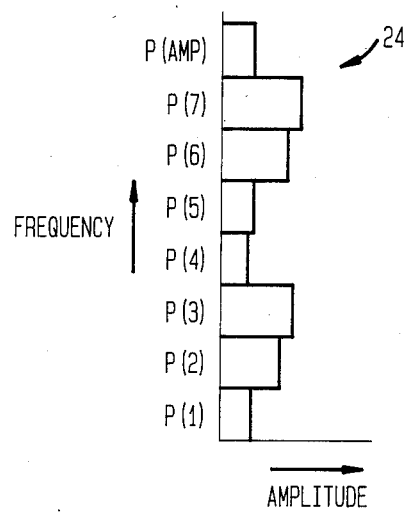
FIG. 2A
(PRIOR ART)
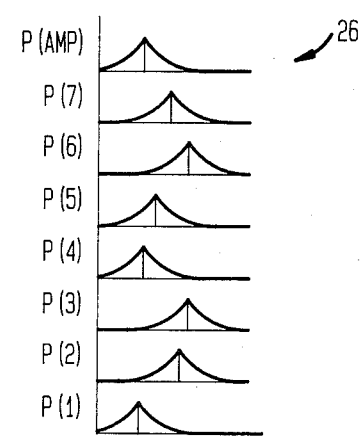
FIG. 2B
(PRIOR ART)
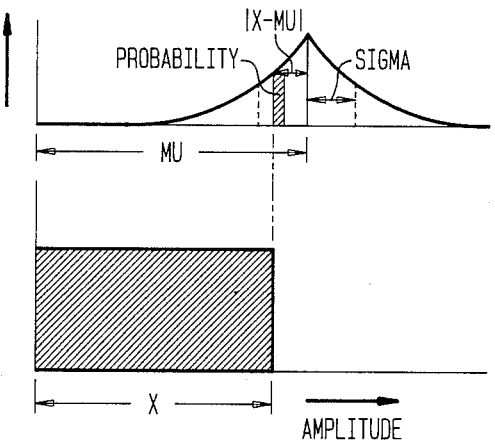
FIG. 3A
(PRIOR ART)
FIG. 3B
(PRIOR ART)

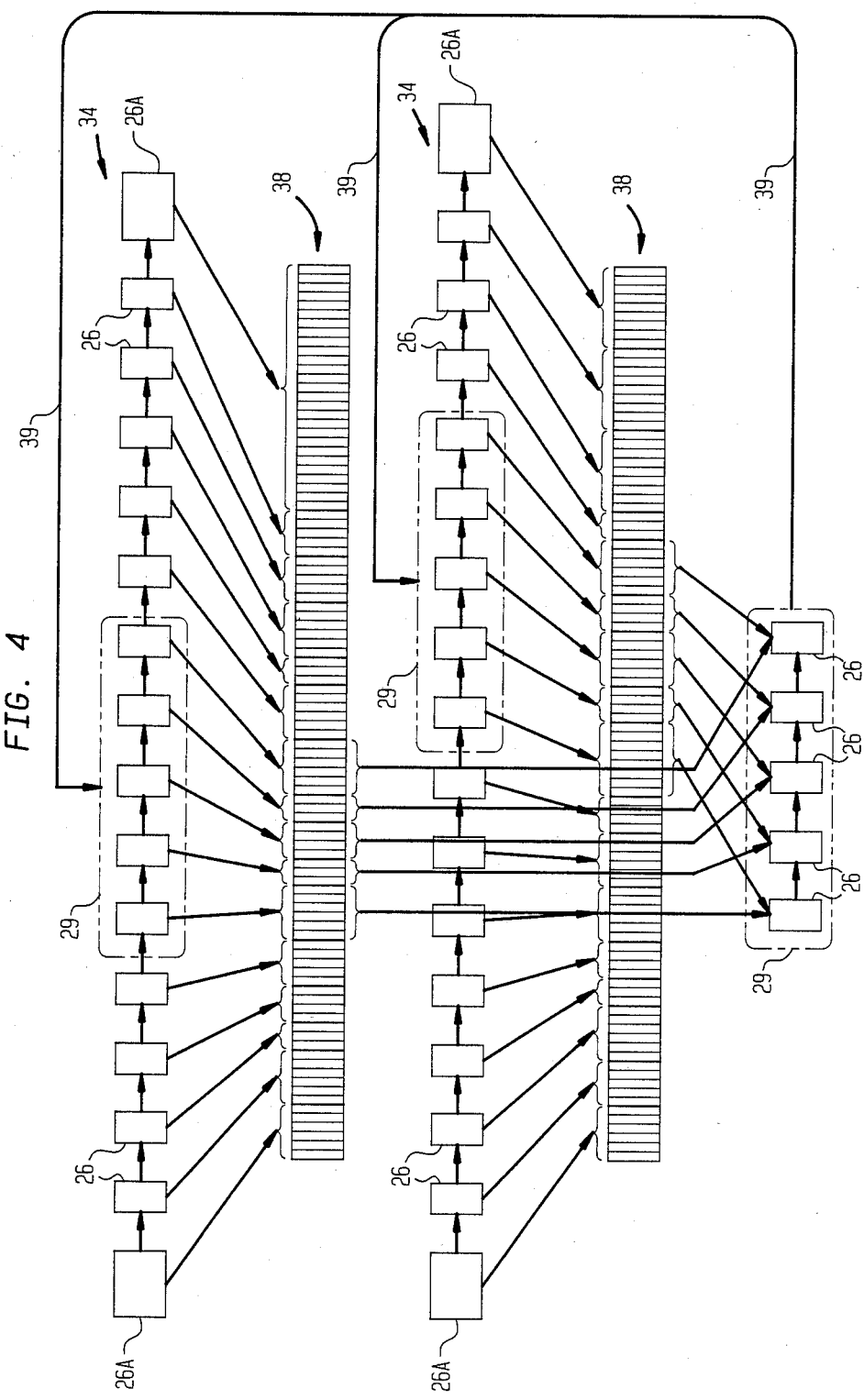

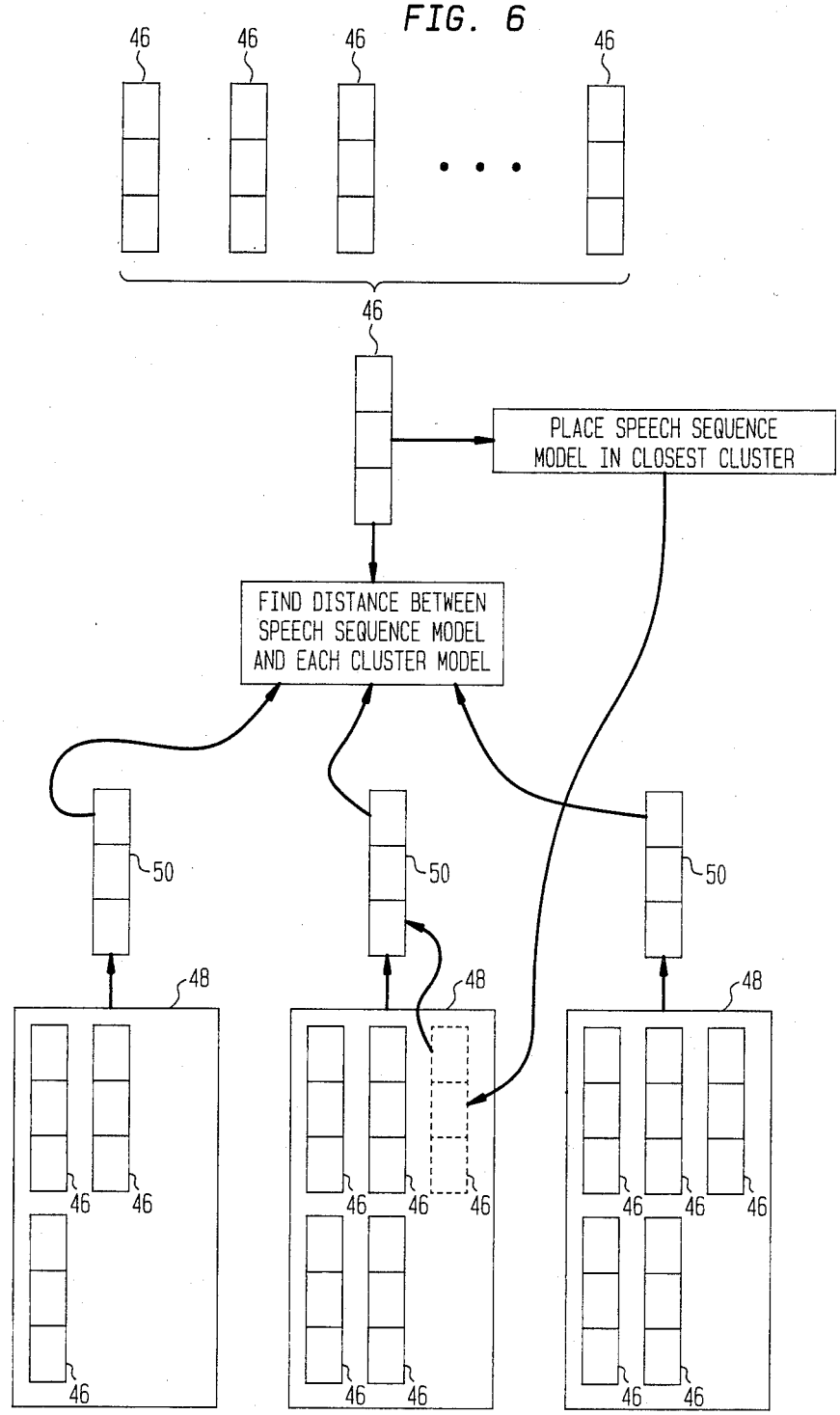

FIG. 8

|  | WORD | | | | |
|---|---|---|---|---|---|
|  | W1 | W2 | W3 | · · · | WN |
| TM1 | PM1 PM2 (52, 52) | PM1 (52) |  |  | PM1 (52) |
| TM2 |  | PM1 (52) | PM1 (52) |  |  |
| TM3 (TIME-ALIGNING MODEL) | PM1 (52) |  | PM1 PM2 PM3 (52, 52, 52) |  | PM1 (52) |
| ⋮ |  |  |  |  |  |
| TMN |  | PM1 (52) | PM1 (52) |  | PM1 PM2 (52, 52) |

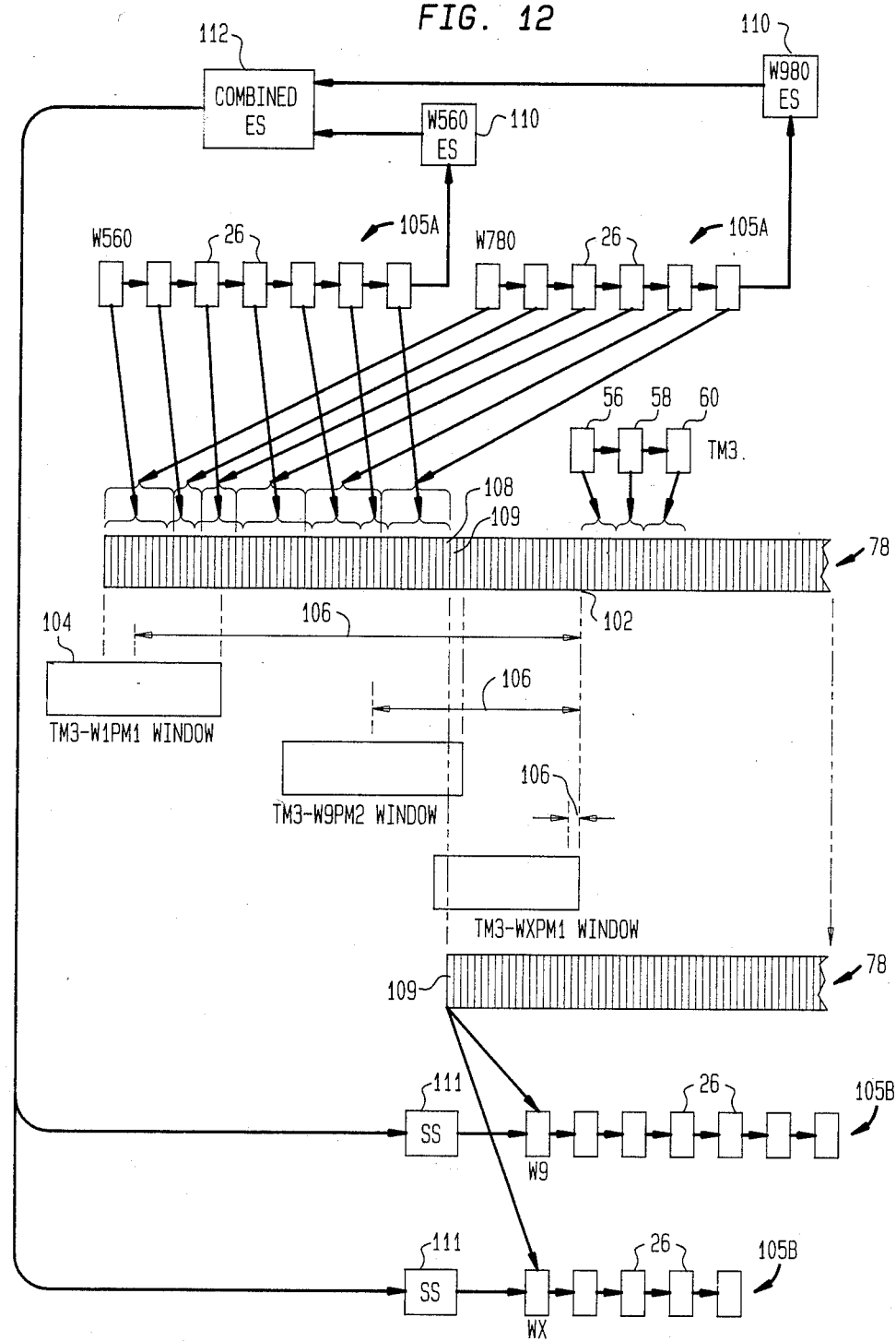

METHOD FOR SPEECH RECOGNITION

FIELD OF THE INVENTION

The present invention relates to speech recognition in general, and, in particular, to methods of performing speech recognition which reduce the amount of computation required to obtain a given level of speech recognition performance.

BACKGROUND OF THE INVENTION

A major problem in speech recognition is that of reducing the tremendous amount of computation which such recognition requires. This is desirable so that such recognition can be performed in a reasonable amount of time by relatively inexpensive computers. Since many speech recognition systems operate by comparing a given spoken utterance against each word in its vocabulary, and since each such comparison can require tens of thousands of computer instructions, the amount of computation required to recognize speech tends to grow in proportion to the vocabulary size. This problem is particularly difficult in systems designed to handle the large vocabularies required to recognize normal speech.

Many speech recognition systems use some form of "dynamic programming", or "DP", algorithm. Typically such systems represent speech as a sequence of frames, each of which represents the speech during a brief period of time, such as a fiftieth or a hundredth of a second. Such systems normally model each vocabulary word with a sequence of node models which represent the sequence of different types of frames associated with that word. At recognition time the DP, in effect, slides forward and backward, and expands and contracts, the node models of each vocabulary word relative to the frames of the speech to find a relatively optimal time alignment between those nodes and those frames. The DP calculates the probability that a given sequence of frames matches a given word model as a function of how well each such frame matches the node model with which it has been time aligned. The word model which has the highest probability scores is selected as corresponding to the speech. DP has greatly improved speech recognition. Its ability to obtain a relatively optimal time alignment between the speech to be recognized and the nodes of each word model compensates for the unavoidable differences in speaking rates which occur in different utterances of the same word. In addition, since DP scores words as a function of the fit between word models and the speech over many frames, it usually gives the correct word the best score, even if the word has been slightly misspoken or obscured by background noises. This is extremely important, because humans often mispronounce words, either by deleting or mispronouncing their proper sounds, or inserting sounds which do not belong in them, and because some form of background noises is unavoidable in most environments in which speech recognition is likely to be used.

DP has a major drawback, however. It requires a tremendous amount of computation. In order for it to find the optimal time alignment between a sequence of frames and a sequence of node models, it has to compare most frames against a plurality of node models. One method of reducing the amount of computation required for DP is to use pruning. Pruning terminates the DP of a given portion of speech against a given word model if the partial probability score for that comparison drops below a given threshold. This greatly reduces computation, since the DP of a given portion of speech against most words produces poor DP scores rather quickly, enabling most words to be pruned after only a small percent of their comparison has been performed. Unfortunately, however, even with such pruning, the amount of computation required in large vocabulary system of the type necessary to transcribe normal dictation is still prohibitively large for present day personal computers.

If the speech to be recognized is continuous speech the computational requirements are even greater. In continuous speech, the type of which humans normally speak, words are run together, without pauses or other simple ques to indicate where one word ends and the next begins. Most humans are unaware of this because our minds are so good at speech recognition that we divide continuous speech into its constituent words without consciously thinking of it. But when a mechanical speech recognition system attempts to recognize continuous speech, it initially has no way of knowing which portions of speech correspond to individual words. Thus it initially has no idea of which portions of speech to compare against the start of word models.

One approach to this problem is to treat each successive frame of the speech as the possible beginning of a new word, and to start performing DP at each such frame against the start of each vocabulary word. But this would require a tremendous amount of computation. A more efficient method used in the prior art only starts DP against new words at those frames for which the DP indicates that the speaking of a previous word has just ended. Although this method is a considerable improvement, there is a need to reduce computation even further by reducing the number of words against which DP is started when there is indication that a prior word has ended.

One such method of reducing the number of vocabulary words against which dynamic programming is started in continuous speech recognition was developed by the inventor of the present invention while formerly employed at IBM. This method associated with each frame of the speech to be recognized a phonetic label which identifies which of a plurality of phonetic frame model compares most closely to that frame. Then it divided the speech into segments of successive frames associated with a single phonetic label. For each given segment, it takes the sequence of five phonetic labels associated with that segment and the next four segments, and goes to a look up table and finds the set of vocabulary words which have been previously determined to have a reasonable probability of starting with that sequence of phonetic labels. It then limits the words against which dynamic programing could start in the given segment to words in that set.

Although this method greatly reduced computation, the look up table it required used too much memory to make the method practical.

Other schemes have been used for reducing the number of vocabulary words against which dynamic programming is performed in discrete, as opposed to continuous, speech recognition. Such prefiltering schemes generally perform a superficial analysis of the separately spoken word to be recognized, and, from that analysis, select a relatively small subset of the vocabulary words as candidates for DP. One such method is disclosed in U.S. Patent application Ser. No. 797,249, filed by Baker et al. on Nov. 12th, 1985 and entitled "Speech Recognition Apparatus and Method" (hereinafter referred to as Application 797,249). Application 797,249 has been assigned to the assignee of the present application and is incorporated herein by reference. It discloses a method of prefiltering which compares three sets of averaged frame models from the beginning of a separate word to be recognized against a corresponding three sets of averaged frame models from each of the vocabulary words. Based on this comparison, it selects which vocabulary words appear similar enough to the speech to warrant a more detailed comparison.

Although the prefiltering of Application 797,249 significantly improves recognition speed, the embodiment of the prefiltering scheme disclosed in that application is not designed for the recognition of continuous speech. In addition, that prefiltering scheme uses linear time alignment to compare a sequence of models from the speech to be recognized against a sequence of models for each vocabulary word. Unlike dynamic programming, linear time alignment does not stretch or compress one sequence so as to find a relatively optimal match against another. Instead it makes its comparison without any such stretching or compression. Its benefit is that it greatly reduces computation, but its drawback is that its comparisons tend to be much less tolerant of changes in the speaking rate, or of insertions or deletions of speech sounds, than comparisons made by dynamic programming. As a result prefiltering schemes which used linear time alignment tend to be less accurate than desired.

In addition to prefiltering of the type described in Application 797,249, which makes a superficial comparison against each word in the system vocabulary, the prior art has used lexical retrieval to reduce the number of vocabulary words against which an utterance has to be compared. In lexical retrieval information from the utterance to be recognized generates a group of words against which recognition is to be performed, without making a superficial comparison against each vocabulary word. In this application, the term "prefiltering" will be used to include such lexical retrieval.

The HEARSAY speech recognition program developed at Carnegie-Mellon University in the early 1970's used lexical retrieval. It had acoustic models of most syllables which occur in English. When an utterance to be recognized was received, it was compared against these syllable models, producing a list of syllables considered likely to occur in the utterance to be recognized. Then words containing those syllables were then chosen for comparison against the utterance to be recognized.

Speech recognition programs written at Bolt, Beranek, and Newman, have performed lexical retrieval by mapping all vocabulary words onto a common tree, in which branches correspond to phonemes. The root of the tree is the start of the word. Its first branches represent all the different initial phonemes contained in the vocabulary words. The second level branches connected to a given first level branch represent all the second phonemes in the vocabulary words which follow the first phoneme represented by the given first level branch. This is continued for multiple levels, so that words which start with a similar string of phonemes share a common initial path in the tree. When an utterance to be recognized is received, its successive parts are compared with a set of phoneme models, and the scores resulting from those comparisons are used to select those parts of the tree which probably correspond to the word to be recognized. The vocabulary words associated with those parts of the tree are then compared in greater detail against the word to be recognized. Another method of lexical retrieval is disclosed in U.S. patent application Ser. No. 919,885, filed by Gillick et al. on Oct. 10th, 1986 and entitled "A Method For Creating And Using Multiple-Word Sound Models in Speech Recognition" (hereinafter referred to as Application 919,885). Application 919,885 has been assigned to the assignee of the present application, and is incorporated herein by reference. It discloses a method of prefiltering which uses linear time alignment to compare a sequence of models from the speech to be recognized against a corresponding sequence of models associated with each of a plurality of word-start cluster models. The word-start clusters are derived by dividing the sequences of acoustic models associated with the start of all of the system's vocabulary words into groups, or clusters, of relatively similary model sequences. Each of the resulting word-start clusters has a sequence of models calculated for it which statistically models the sequence of models placed within it, and this sequence of models form the word-start cluster model for that cluster. The use of word-start cluster models greatly reduces computation. It does this because it enables the system to determine if a given portion of the speech to be recognized is similar to the start of a whole group of words by comparing that portion of speech against the word-start cluster model for that group, rather than requiring a comparison against a separate model representing each word in that group.

The prefiltering method described in Application 919,885 provides good prefiltering, but the embodiment of that method shown is designed for separately spoken words, rather than continuous speech.

SUMMARY OF THE INVENTION

It is an object of the present invention to provide speech recognition methods which reduce the amount of computation required to achieve a given degree of speech recognition performance.

It is yet another object of the present invention to provide speech recognition methods which compare a sequence of sounds to be recognized against each of a plurality of sound sequence models and which effectively compensate each such comparison for variations in the speed at which the sequence to be recognized is said, and which does this without requiring the time warping of that sequence against each such model.

It is a further object of the present invention to provide speech recognition methods capable of reducing the amount of computation required for continuous speech recognition.

It is yet another object of the present invention to provide an efficient method of selecting which vocabulary words warrant detailed comparison with successive portions of a length of continuous speech to be recognized.

It is still another object of the invention to provide speech recognition methods which improve the chance of detecting the correct word without unduly increasing the amount of computation required.

According to one aspect of the present invention a method of recognizing speech is provided which determines if a given portion of speech to be recognized corresponds to a speech pattern. Basically the method time aligns both the speech to be recognized and a plurality of speech pattern models against a common time-aligning model and then compares the resulting time-aligned speech model against each of the resulting time-aligned pattern models. The time-alignment against a common time-alignment model cause the comparisons between the speech model and each of the pattern models to compensate for variations in the rate at which the portion of speech is spoken, without requiring each portion of speech to be separately time aligned against each pattern model.

In a preferred embodiment this method is used to select which speech patterns warrant a detailed comparison against a given portion of the speech. Preferably the speech patterns whose time-aligned models are compared against the time-aligned speech models are shorter than most vocabulary words, while the sound patterns selected for a detailed comparison against the speech are to represent entire words.

In a preferred embodiment there are a plurality of time-aligning models, against which both the speech to be recognized and the speech patterns are time aligned. Preferably the time-aligning models are prepared by: (1) using dynamic programming to divide each speech sequence into segments; (2) deriving a sub-model for each such segment and combining the sub-models for each speech sequence into a speech sequence model; (3) dividing the speech sequence models produced for different speech sequences into clusters of relatively similar such models; (4) deriving for each such cluster a model having a sequence of sub-models and representing the speech sequence models grouped into that cluster; and (5) using the resulting cluster models as time-aligning models. Preferably the dynamic programming divides each vocabulary word into a plurality of segments, with each speech segment model representing N segments from a given word, where N is an integer, so that the time-aligning models and the time-aligned pattern models also only have N sub-models. In one such embodiment, each of the N sub-models of the time-aligning models has an M dimensional probability distribution, where M is the number of parameters in each frame representing the speech to be recognized. In this embodiment, each time-aligned speech model is an N×M vector of parameter values; the time-aligned pattern model is an N×M probability distribution; and the comparison between a time-aligned speech model and a time-aligned pattern model is performed by taking the likelihood of the speech model being generated by the probability distribution of the time-aligned pattern model.

In embodiments of the method having a plurality of time-aligning models, it is preferred that the speech be scored against a plurality of such models, and that the time-aligned speech model and the time-aligned pattern models associated with the best scoring time-aligning model be compared against each other. Preferably the selection of such a best scoring time-aligning model and the comparison between its associated time-aligned speech and pattern models is performed repeatedly, for successive regions of the speech to be recognized. In such a case, it is preferred that word scores, each indicating the probability that a give portion of speech corresponds to a given word, are calculated for various points in the speech. This is done, for a given word, by combining scores produced, for each of a succession of best scoring time-alignment models, by comparing that best scoring model's associated time-aligned speech model against its associated time-aligned pattern models for the given word. The number of successive best scoring time-alignment models used to calculate a given word score is determined by the length of time, in previous utterances of the word, between the sounds corresponding to the last of the best scoring time-alignment models used in such calculation and the beginning of that word.

According to another aspect of the invention, the invention provides a method for recognizing continuous speech. The method includes providing a plurality of cluster models, each with a sequence of acoustic sub-models. The cluster models are derived by dividing each vocabulary word into segments; deriving a sub-model from each such segment; combining a plurality of sub-models from a given word into a sequence; dividing the sequences of sub-models from different words into clusters of relatively similar sequences; and calculating a cluster model for each such cluster which represents the sequences which have been grouped into that cluster. The method further includes comparing a portion of the speech to be recognized with a plurality of such cluster models; selecting the cluster models to which the portion of speech compares most closely; and performing further comparison between that portion of speech and the words whose sequences of sub-models have been associated with the cluster models against which that portion of speech compares most closely.

According to another aspect of the invention, a method of recognizing continuous speech is provided which includes scanning speech for acoustic patterns associated with one or more vocabulary words. When such patterns are detected, a range of most likely start times is calculated for each of its associated vocabulary words. The method also performs a computationally intensive comparison between portions of the speech and selected vocabulary words, including determining when there is a reasonable probability that a match between a given word and the speech has ended. When such a ending time occurs, the method selects those vocabulary words whose range of start times overlaps that ending time, and performs the intense comparison of those words against the speech starting approximately at that given ending time.

In a preferred embodiment of this method the intensive comparison includes dynamic programming. The dynamic programming generates endscores at successive times in the speech, indicating the probability that the match of a given vocabulary word against the speech ends at the endscore's time. When a given endscore is better than a threshold value it indicates a reasonable probability that the match represented by the endscore has ended. Preferably the initial score for the dynamic programming of vocabulary words whose range of start times overlap a given ending time is a function of the combination of endscores at that ending time.

In a preferred embodiment of this aspect of the invention, the range of start times for a vocabulary word is determined by calculated back a given duration from the time at which the word's associated pattern is detected in the speech. This given duration is derived from observations of the length of time, in previous utterances of the word, between the occurrence of that pattern and the beginning of the word. Similarly the width of that range is determined as a function of the amount of variation observed, in previous utterances of the word, between the occurrence of that pattern, and the beginning of the word.

DESCRIPTION OF THE DRAWINGS

These and other aspects of the present invention will become more evident upon reading the following description of the preferred embodiment in conjunction with the accompanying drawings, in which:

FIG. 2A is a schematic representation of a frame, that is, an acoustic description of a speech signal over a brief period of time, which indicates the value of eight parameters of the signal during that period; and FIG. 2B is a schematic representation of an eight-dimensional probability distribution model for a given class of sounds, which represents the probability of various values for each of the eight parameters of frames associated with the class of sounds represented by such a model;

FIG. 3A is a more detailed drawing of one dimension of a probability distribution of the type shown in FIG. 2B; FIG. 3B is an expanded drawing of one parameter from a frame of the type shown in FIG. 2A; and together the two show how the probability distribution shown in FIG. 3A has a given probability associated with the given parameter value X shown in FIG. 3B;

FIG. 4 is a schematic representation of phrase models of the type formed in FIG. 1 for each of two separate phrases being time aligned by dynamic programming against continuous utterances of their respective phrases to derive more accurate versions of those phrase models;

FIG. 6 is a schematic representation of a clustering process by which a plurality of speech sequence models derived by the method of FIGS. 5A, 5B, and 5C are divided into clusters of such speech sequence models which are relatively similar to each other, and how a cluster model, called a time-aligning model, is derived for each such cluster;

FIG. 8 is a schematic representation of how each time-aligning model has zero or more time-aligned pattern models associated with each vocabulary word;

FIG. 12 is a schematic representation of how ranges of possible starting times are calculated for each of the words which has a word score calculated by the method of FIG. 11 that is above a given threshold, and how, when the computationally intensive dynamic programming which is performed for selected word candidates produces an endscore above a given threshold, the dynamic programming process is started against each of the words whose range of start times overlap the frame having that endscore.

DETAILED DESCRIPTION OF A PREFERRED EMBODIMENT

Figure 1:
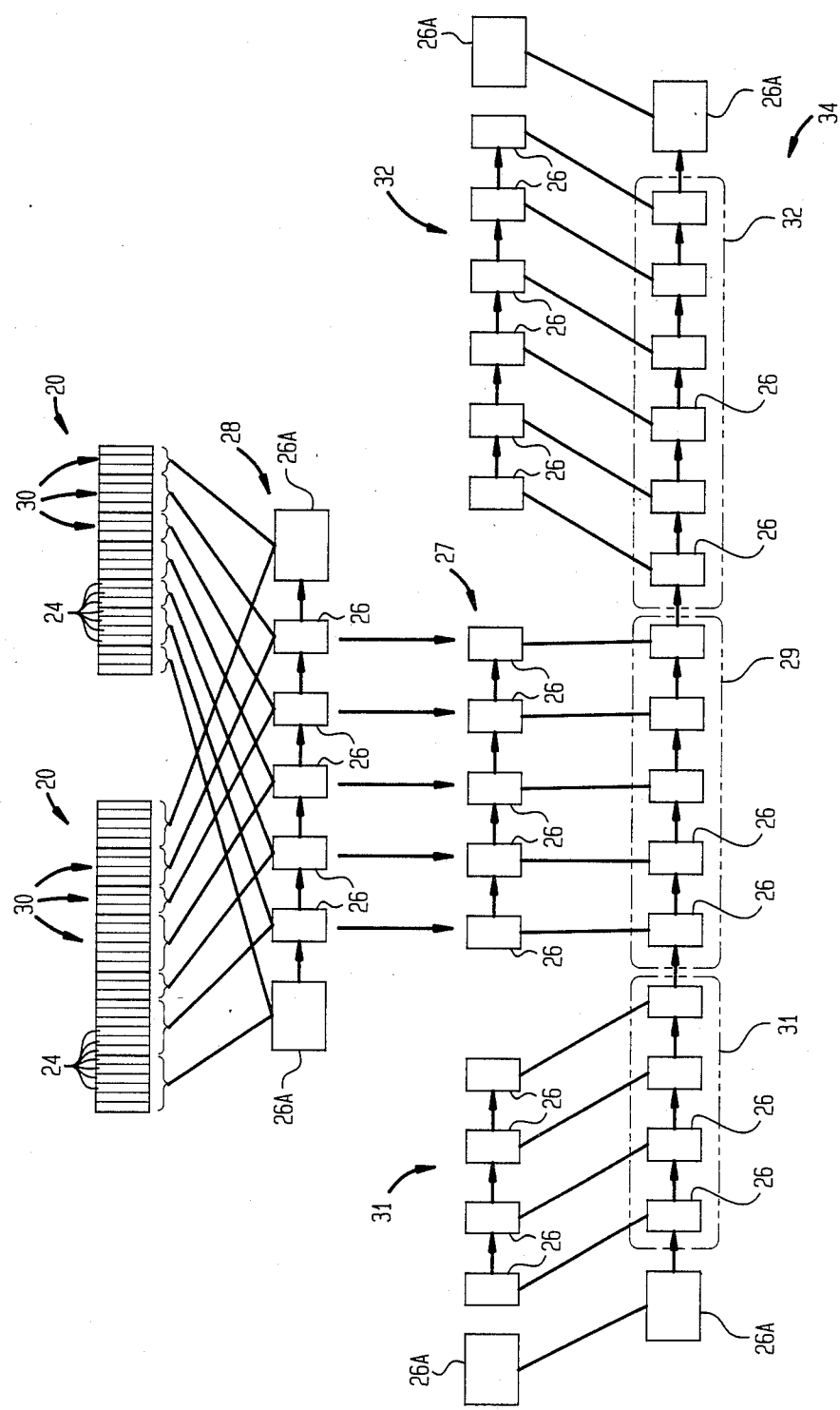
FIG. 1 is a schematic representation of the process by which multiple utterances of a given vocabulary word are spoken, dynamic programming is used to develop a sequence of node models to represent the given word, and the resulting node mode is combined with similar node models from other words to form a sequence of node models representing a phrase.

Referring now to FIG. 1, in the preferred embodiment of the present invention, the invention is used in a system for recognizing continuous speech. In order to train this system to recognize continuous speech, it is necessary to train models of each word spoken in a continuous context. This is done by the process shown in FIGS. 1 and 4. First, a user speaks multiple utterances of each vocabulary word, such as the utterances 20 shown in FIG. 1. In the preferred embodiment, the speech signal produced by each such utterance is converted into a sequence of acoustic descriptions, or frames, 24, each of which consists of eight parameter values P(1)–P(amp) as is shown in FIG. 2A.

Methods for deriving frame-based representations are well known in the speech recognition art. In the preferred embodiment, the frame-based representation is derived by calculating a frame every fiftieth of a second. For each such frame the amount of energy contained in each of eight frequency bands is calculated. The value P(amp) is produced as a logarithmic function of the total energy contained in all eight bands. Then each of the parameters P(1)–P(7) are calculated as logarithmic functions of the amount of energy in each of the seven lowest of the eight frequency bands, after normalization relative to the value P(amp). A more detailed description of a method of deriving such a frame-based representation is contained in the above mentioned application Ser. No. 797,249.

After one or more discrete utterances 20 of a given vocabulary word have each been converted into a sequence of frames 24, as shown in FIG. 1, a process known in the art of speech recognition as dynamic programming is used to derive a word model 28, comprised of a sequence of acoustic sub-models 26, called node models, for the given word. First, in a process not shown in FIG. 1, this process divides the frame sequences associated with the utterances of the word into a series of corresponding segments. Then the process calculates a separate node model 26 to represent the frames associated with each of the resulting group of corresponding segments. Thus, all the frames associated with the first segment in each such utterance are combined to calculate a first node model 26; all the frame associated with the second segment in each such utterance are combined to calculate a second node mode 26; and so on. In the preferred embodiment, each node model is an eight-dimensional probability distribution such as that shown in FIG. 2B. Each dimension of which has an expected value, or mu, calculated as the average value for a given parameter over all the frame used to calculate the node model. Each such dimension also has a "sigma" or absolute deviation, which represents the extent to which the values for the given parameter vary over those frames. In the preferred embodiment, the probability distribution of each dimension of the model 26 is represented as a Laplacian probability distribution in which the shape of the dimension's distribution is completely determined by its associated mu and sigma.

Once an initial word model 28 has been calculated for a given word, the dynamic programming time aligns the initial word model against each utterance 20 of its associated word. This time aligning divides each utterance into a sequence of segments 30 which provide a relatively optimal match between the frame sequence of each utterance and the sequence of nodes 26 of the word model 28, based on the similarity between the parameter values of the frames in each segment 30 and the probability distribution of the node 26 time aligned against that segment. Then, as is shown in FIG. 1, the dynamic programming takes all the frames in each of the utterances of the word which have been time aligned against a given node and uses them to calculate a new model for that node. This process of calculating node models, time aligning them against each of the utterances of the word, and then calculating new node models is repeated until the sequence of node models 26 for a given word approach a local optimum.

For a more detailed description of such a dynamic programming process, please refer to U.S. patent application Ser. No. 862,275 filed by Gillick et al. on May 12, 1986, entitled "A Method for Representing Word Models for Use in Speech Recognition". This prior application is assigned to the assignee of the present application and is incorporated herein by reference.

After a relatively optimal sequence of node models 26 has been derived by the dynamic programming process to represent the multiple discrete utterances 20 of a given vocabulary word, the first and last nodes of that sequence, both labeled 26A in FIG. 1, are removed. This is done because the nodes 26A are associated with the silence that precedes and follows each discrete utterance of the vocabulary word. The resulting word model 29 represents the sound of the word, minus initial and final silences. Similar word models 30 and 32 from other words are concatenated with the word model 29 to form a node-based phrase model 34 which represents an entire phrase comprised of a plurality of words. As is shown in FIG. 1, silence node models 26A are added to the beginning and end of this phrase model, so the phrase model can be time aligned against utterances of the phrase it represents when that phrase is spoken with preceding and following silences.

Referring to FIG. 4, once the process of FIG. 1 has been performed for each of a plurality of phrases, the resultant phrase models 34 are time aligned by dynamic programming against continuous utterances 38 of their respective phrases. This time alignment divides each phrase utterance up into segments of frames which correspond to each node 26 of the phrase model. Then, in a manner similar to that described above with regard to FIG. 1, a new model is calculated for each node 26 from all of the frames time aligned against that node. But because each vocabulary word is included in a plurality of phrases, the new node models of each word model included in a given phrase model are calculated from all of the frames time aligned against that node in all of the utterances of all phrases which include that node's word. This is indicated in FIG. 4 by the word model 29, which occurs in both of the phrase models 34 shown in that figure. All of the frames in the utterances 38 of two different phrases which are time aligned against a given node 26 of the word model 29 are used to calculate a corresponding new node model 26 for that word model, as is shown at the bottom of that figure. Once this has been performed for each node of a given word model, the resulting new word model for that word is substituted for its old word model in each phrase model in which that word model occurs, as is indicated by the arrows 39 running up from the bottom of FIG. 4.

FIG. 4 only shows two phrase models 34, but in the preferred embodiment there are actually enough phrase models so that each vocabularly word occurs in many different phrases. Once a new word model has been calculated for each vocabulary word, and each such new word model has been placed into all the phrase models 34 in which it occurs, the process of time aligning phrase models against phrase utterances, calculating new word models, and substituting the new word models in the phrase models is repeated until the dynamic programming process produces a relatively optimal set of continuous speech word models.

The purpose of the process shown in FIGS. 1 and 4 is to produce continuous-speech word models which provide a statistical representation of how each vocabulary word is spoken in a plurality of different continuous speech contexts. As those skilled in speech recognition understand, a given word is spoken differently in different continuous speech contexts. In particular, its initial and final sounds are often greatly affected by the sounds that precede or follow such a word. The process shown in FIGS. 1 and 4 enables the word model calculated for each vocabulary word to reflect the degree to which each of its node models is affected by adjacent words. Nodes that are greatly affected by the sounds of adjacent words will tend to have much broader probability distributions for their parameters than nodes which are relatively unaffected by contextual factors.

Figure 5A:
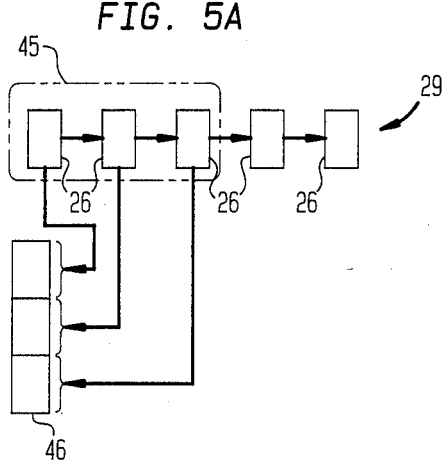
FIGS. 5A, 5B, and 5C show how each complete sequence of three successive nodes which belongs to a given vocabulary word is treated as a speech sequence and how the three separate nodes in each such sequence are concatenated to form a speech sequence model.
Figure 5B:
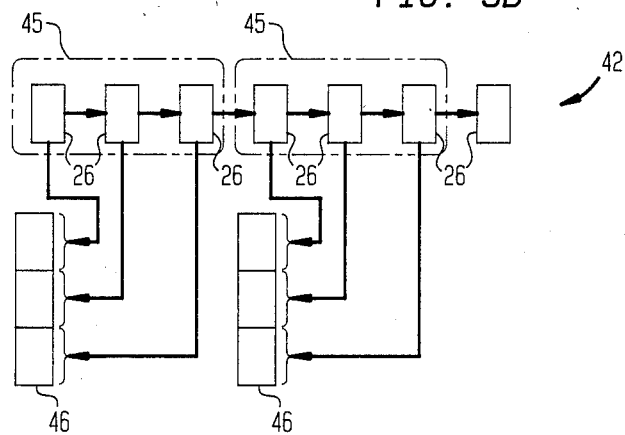
Figure 5C:
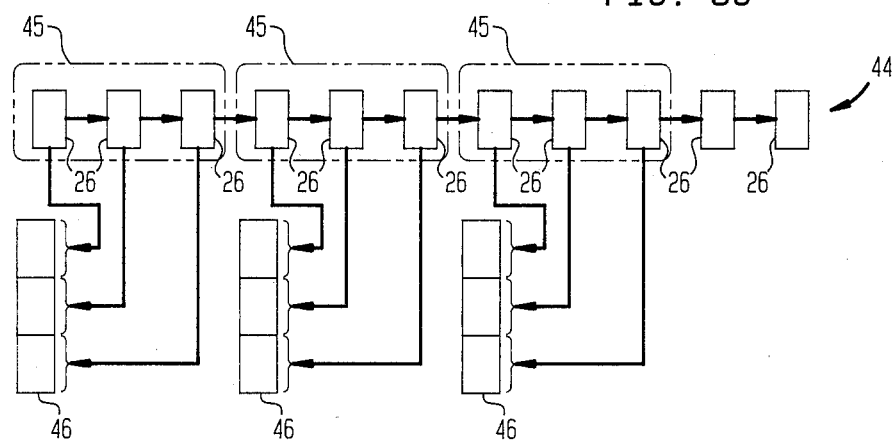

Referring now to FIGS. 5A, 5B, and 5C, once the process of FIG. 4 has calculated continuous speech models for each word, such as the models 29, 42 and 44 shown in FIGS. 5A, 5B, and 5C, respectively, each such word model is divided into groups of three consecutive nodes. Each of these groups 45 represents a speech sequence, that is, a short sequence of speech sounds associated with a given word. As is shown in the FIGS. 5A through 5C, if the number of nodes 26 contained in a given word model cannot be evenly divided by three, the remainder of nodes are not included in any such speech sequence. After each of the word models has been divided into one or more speech sequences, the three nodes in each such speech sequence are concatenated to form a speech sequence model 46. Thus each of the eight-dimensional probability distributions associated with each of the nodes in a given speech sequence, are concatenated to form the speech sequence model 46 which has a single 24-dimensional probability distribution.

Once each vocabulary words has had one or more speech sequence models 46 calculated for it, all of the models 46 calculated for all vocabulary words are divided into clusters of relatively similar such models, as is indicated in FIG. 6. Methods for clustering probability distributions, such as those of the models 46, are known in the statistical arts, and a relatively detailed description of one such clustering algorithm is given in the above mentioned application Ser. No. 862,275. Basically, such a clustering technique divides all of the models 46 into groups, or clusters 48, of models which have relatively similar probability distributions. It calculates a cluster model 50 for each such cluster. Each such cluster model is a 24-dimensional probability distribution which statistically represents the 24-dimensional probability distributions of the speech sequence models 46 placed within its corresponding cluster.

As is indicated in FIG. 6, the clustering algorithm finds the distance between the probability distribution of a speech sequence model 46 which is to be clustered and the probability distributions of each of the cluster models 50, using a statistical metric which measures the similarity or dissimilarity between probability distributions. When it finds the cluster model most similar to the speech sequence model 46, it places that speech sequence model into the cluser associated with that cluster model and then recalculates the cluster model to reflect its addition. If there is no cluster model within a given clustering threshold distance from the given speech sequence model, then that speech sequence model is placed within its own cluster. This clustering process is repeated through multiple iterations until the division of the speech sequence models into clusters becomes relatively optimal.

The number of clusters produced by the clustering process can be varied by varying the clustering threshold which causes an individual model 46 to be placed into its own cluster if it is not closer than that threshold to any other cluster model. In the preferred embodiment, the clustering threshold is set to produce the smallest number of clusters which provide a relatively high level of performance for the speech recognition method of the present invention.

Figure 7:
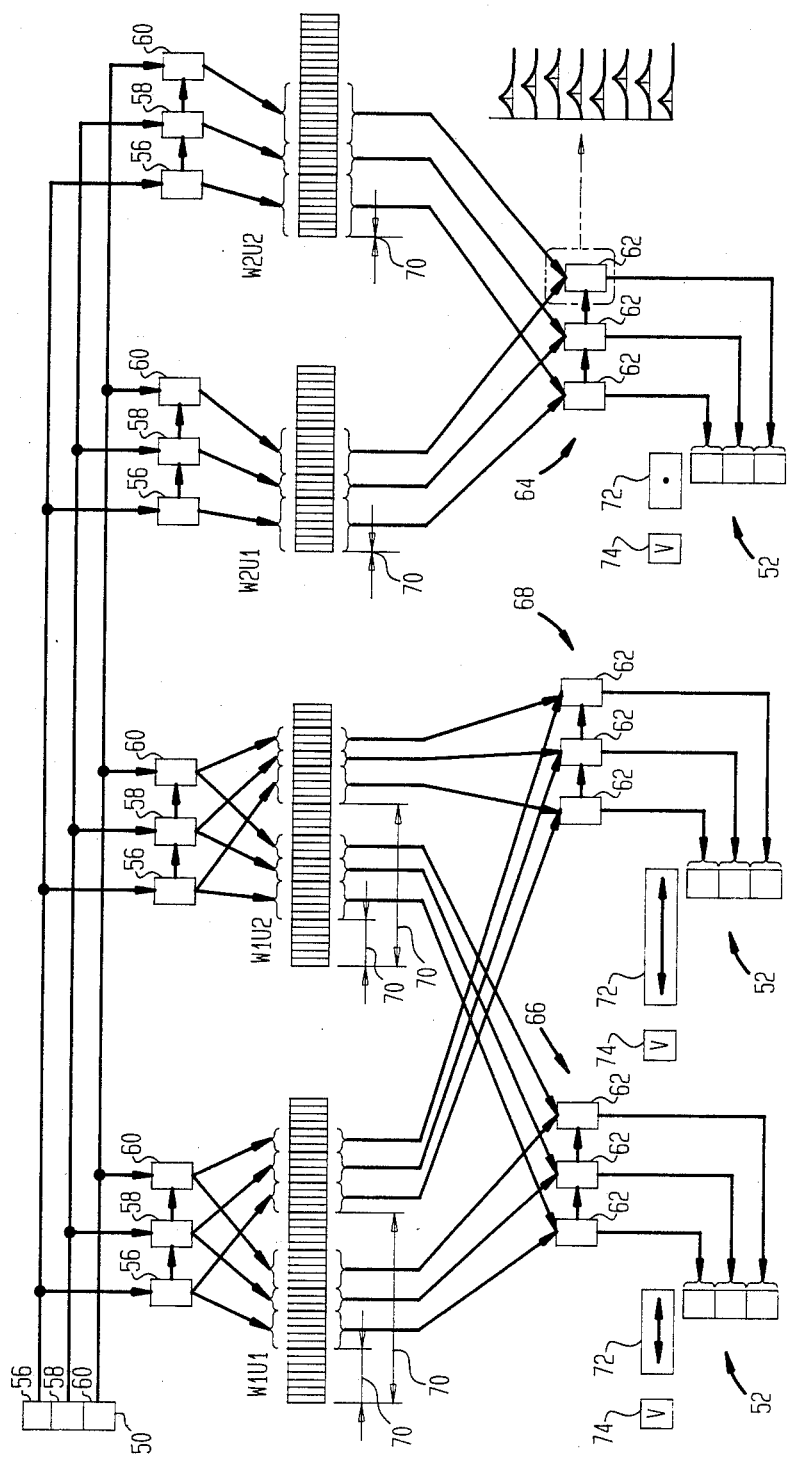
FIG. 7 is a schematic diagram illustrating how each of the time-aligning models derived by the method shown in FIG. 6 is compared against the full length of multiple utterances of each vocabulary word to determine which, if any, portions of those vocabulary words it matches with a certain degree of closeness, and showing how, when such a match is detected, a time-aligned pattern model, comprised of a sequence of sub-models, is formed to represent the frames time aligned against each of the nodes of the time-aligning model.
Figure 9:
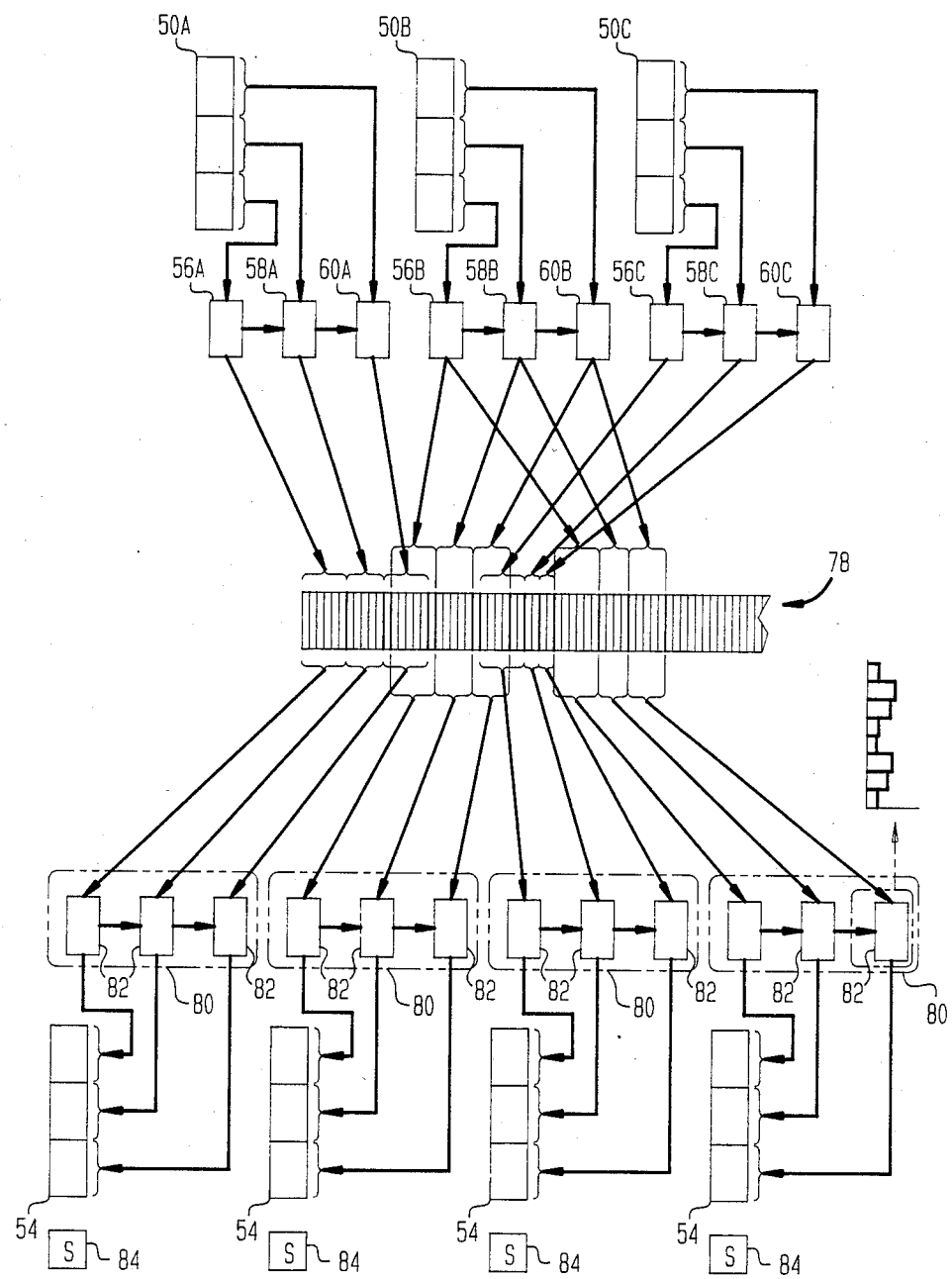
FIG. 9 is a schematic representation of the process by which each of the time-aligning models is compared against an entire length of speech to be recognized, and how, at each location at which a given time-aligning model matches the speech representation with a given degree of closeness, a time-aligned speech model is calculated for that match.

In the remainder of the application we refer to the cluster models 50 as time-aligning models, since, according to an important aspect of the present invention, they are time aligned against speech patterns to produce the time-aligned pattern models 52 shown in FIG. 7, and time aligned against the speech to be recognized to produce the time-aligned speech models 54 shown in FIG. 9. Since the time aligning of both the speech patterns and the speech to be recognized against common time-aligning models 50 tends to adjust the resulting time-aligned pattern and speech models to a common time scale, such pattern models and speech models can be compared against each other without the need for further dynamic programming.

Referring now to FIG. 7, once all the speech sequence models 46 have been clustered and time-aligning models 50 have been calculated for each resulting cluster, each such time-aligning model is compared by dynamic programming against the multiple utterances of each vocabulary word. FIG. 7 shows a given time-aligning model 50 being time aligned against multiple utterances U1 and U2 of a first word, W1, and against multiple utterances U1 and U2 of a second word, W2.

As is described above, each of the time-aligning models 50 is composed of a 24-dimensional probability distribution derived from the 24-dimensional probability distributions of the speech sequence models 46 placed within its corresponding cluster. The first eight dimensions of the time-aligning model, labeled 56 in FIG. 7, represent the first nodes 26 of the speech sequence models 46 placed within its associated cluster. Similarly, the second eight dimensions 58 and the third eight dimensions 60 of the time-aligning model 50 correspond, respectively, to the second and third node models 26 from those speech sequence models. When each time-aligning model 50 is time aligned against utterances of vocabulary words, it is represented as a sequence of the three eight dimensional nodes, or sub-models, 56, 58, and 60.

The dynamic programming compares the sequence of nodes 56, 58, and 60 of the time-aligning model 50 against the entire length of each utterance of each vocabulary word. When the dynamic programming indicates that this sequence of nodes matches a given portion of the speech with at least a certain degree of closeness, it calculates a sequence 64 of node models 62. Each node model 62 is an eight dimensional probability distribution calculated from all of the frames in each utterance of a given vocabulary word in a corresponding part of that utterance which have been time aligned against a given one of the three nodes of the time-aligning model 50. In the utterances of word W2 shown in FIG. 7, this is relatively straightforward, since there is only one better than threshold match between the time-aligning model and the utterances of that word. Thus, all of the frames time aligned against the first node model 56 of the time-aligning model in all utterances of the word W2 are combined to form the first node 62; all of the frames time aligned against the second node 58 are combined to form the second node 62; and all of the frames time aligned against the third node model 60 are combined to calculated the third node 62.

A slightly more complex situation exists with regard to word W1 in the example shown in FIG. 7, since the time-aligning model 50 has a better than threshold match against each of the utterances of that word in two separate places. In this case, the frames time aligned against the first match are used to form a first sequence 66 of three nodes 62, and the frames time aligned against the second match are combined to form the second sequence 68 of such nodes.

As is indicated in FIG. 7, each of the three eight-dimensional probability distributions of each of the sequences 66 and 68 are concatenated into 24-dimensional probability distributions, or time-aligned pattern models 52. Each of these time-aligned pattern models represents a sequential pattern of sound which occurs in its associated vocabulary word and which matches relatively well against its associated time-aligning model.

As is also indicated in FIG. 7, each time a better than threshold match is detected between a time-aligning model 50 and the utterances of a given vocabulary word, a measurement is made of the number of frames between the first frame of that match and the first frame of the utterance, as is indicated by the arrows 70. Each vocabulary word utterance used in the method of FIG. 7 corresponds to a portion of a phrase utterances 38 which has been time aligned by dynamic programming against that vocabulary word's word model in the process of FIG. 4. Thus, the utterances used in the method of FIG. 7 are not preceded by silence, and, thus, the number of frames indicated by the measurement 70 indicate quite accurately the distance between the portion of the word which matches the time-aligning model and the beginning of that word. When each time-aligned pattern model 52 is formed, all of the measurements 70 associated with it are averaged and stored as a value 72. In addition, a variation value 74 is recorded in association with each value 72. The variation value stores a measure of the variation of the values 70 associated with a given time-aligned pattern model 52.

Referring now to FIG. 8, after the process of FIG. 7 has compared each time-aligning model 50 against all utterances of all vocabularly words, each time-aligning model has associated with it zero or more time-aligned pattern models for each vocabulary word. This is indicated by the matrix of FIG. 8 in which the rows indicate the pattern models associated with each individual time-aligning model and the columns represent the pattern models associated with each vocabulary word.

Referring now to FIG. 9, when a portion 78 of speech to be recognized is spoken, each of the time-aligning models, represented in FIG. 9 by the three models 50A, 50B, and 50C, is compared against the entire length of that speech. This is done by breaking the 24-dimensional probability distribution of each such time-aligning model into a sequence of three eight-dimensional probability distributions, in the manner described with regard to FIG. 7. Dynamic programming is then used to match each of these sequences of nodes against the sequences of frames in the utterance 78. When a given time-aligning model has a better than threshold match against a given portion of the speech 78, a sequence 80 of three eight dimensional parameter vectors 82 is calculated for each such match. Each such parameter vector 82 is calculated from those frames of the speech 78 which have been time aligned by the match against a given one of the three nodes of the time-aligning model. Each parameter of the eight dimensional parameter vector 82 is calculated by averaging the values of the corresponding parameters of its associated frames.

Once each of three eight-dimensional parameter vectors 82 has been calculated for a given match, they are concatenated to form a 24-dimensional parameter vector 54. This model is referred to as a time-aligned speech model, or speech vector, in the application and claims that follows. Associated with each such speech vector is a score 84 which indicates the closeness of the match between a its associated time-aligning model and its associated portion of the speech 78.

Although FIG. 9 only shows three time-aligning models 50 being time aligned against the speech, it should be understood that in the preferred embodiment a larger number, such as 20 to 50, of time-aligning models are used. As a result, there are normally a much larger number of better than threshold matches between time-aligning models and the speech than is shown in FIG. 9, and thus, a much greater number of time-aligned speech vectors.

Figure 10:
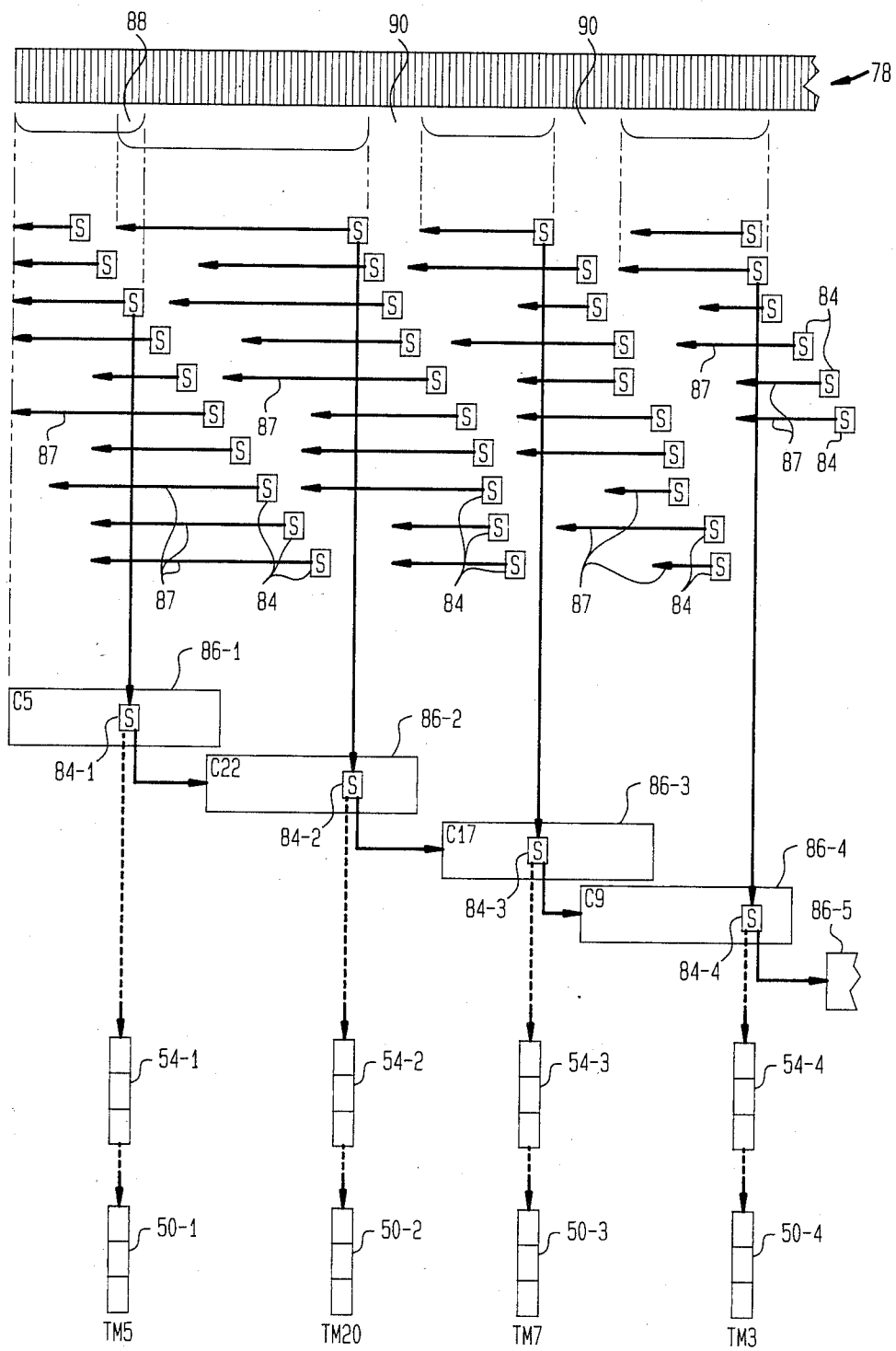
FIG. 10 is a schematic representation of how a sequence of best scoring matches between time-aligning models and a length of speech to be recognized is selected from the relatively large number of matches which take place along such a length of speech.

Referring now to FIG. 10, a method for dealing with this profusion of time-aligned speech vectors is indicated. This is done by selecting at the beginning of the speech to be recognized an initial window 86-1. This window corresponds in length to the average number of frames time aligned against all the individual time-aligning models. Then the highest score 84-1 which is generated during that window 86-1 is selected. Its associated time-aligned speech vector 54-1 is considered as the best scoring time-aligned speech vector for that period, and the time-aligning model 50-1 whose match against the speech 78 gave rise to that best score 84-1 is selected as the best scoring time-aligning model for that window.

After the best score 84-1 has been selected, a new window 86-2 is calculated. This window has the same width as the window 86-1, and it starts a given number of frames after the frame associated with the end of the match giving rise to the best scoring time-aligned speech vector 54-1. This given number of frames is equal to the smallest number of frames associated with any of the time-aligned pattern models 52. Once the location of the new window 86-2 has been calculated, the best score 84-2 which occurs for a match between a given time-aligning model and the speech 78 is selected, and its corresponding time-aligned speech vector 54-2 and its corresponding time-aligning model 50-2 are also selected. Then this process of calculating a new window and its associated best scoring match is repeated, as is shown in FIG. 10, for the windows 86-3 and 86-4. As a result, a sequence of best scoring time-aligned speech models 54-1, 54-2, 54-3 and 54-4 and best scoring time-aligning models 50-1, 50-2, 50-3, and 50-4 are generated.

As FIG. 10 indicates, each match between a time-aligning model and the speech 78 has a length 87 associated with it. As can be seen from FIG. 10, it is possible that the portions of speech associated with adjacent best scoring matches may overlap in certain portions 88 of the speech, and may have gaps 90 between them in other portions of the speech. This is not generally a problem, since most words are substantially longer than the distance between adjacent windows 86-1 through 86-4. However, in continuous speech, certain short function words such as "a", "the", and "to", are often spoken in a very reduced, and thus very short, form. When this happens, such word might well fit in the gaps 90 shown in FIG. 10, or may not match well against the time-aligned pattern model derived from such short words. For this reason, it is suggested that the method of the present invention be used in conjunction with another method that is designed to detect the probability of such short function words. For example, one such method would continually perform dynamic programming between all such short function words and the speech to be recognized so as to detect any such brief occurrences of them.

Figure 11:
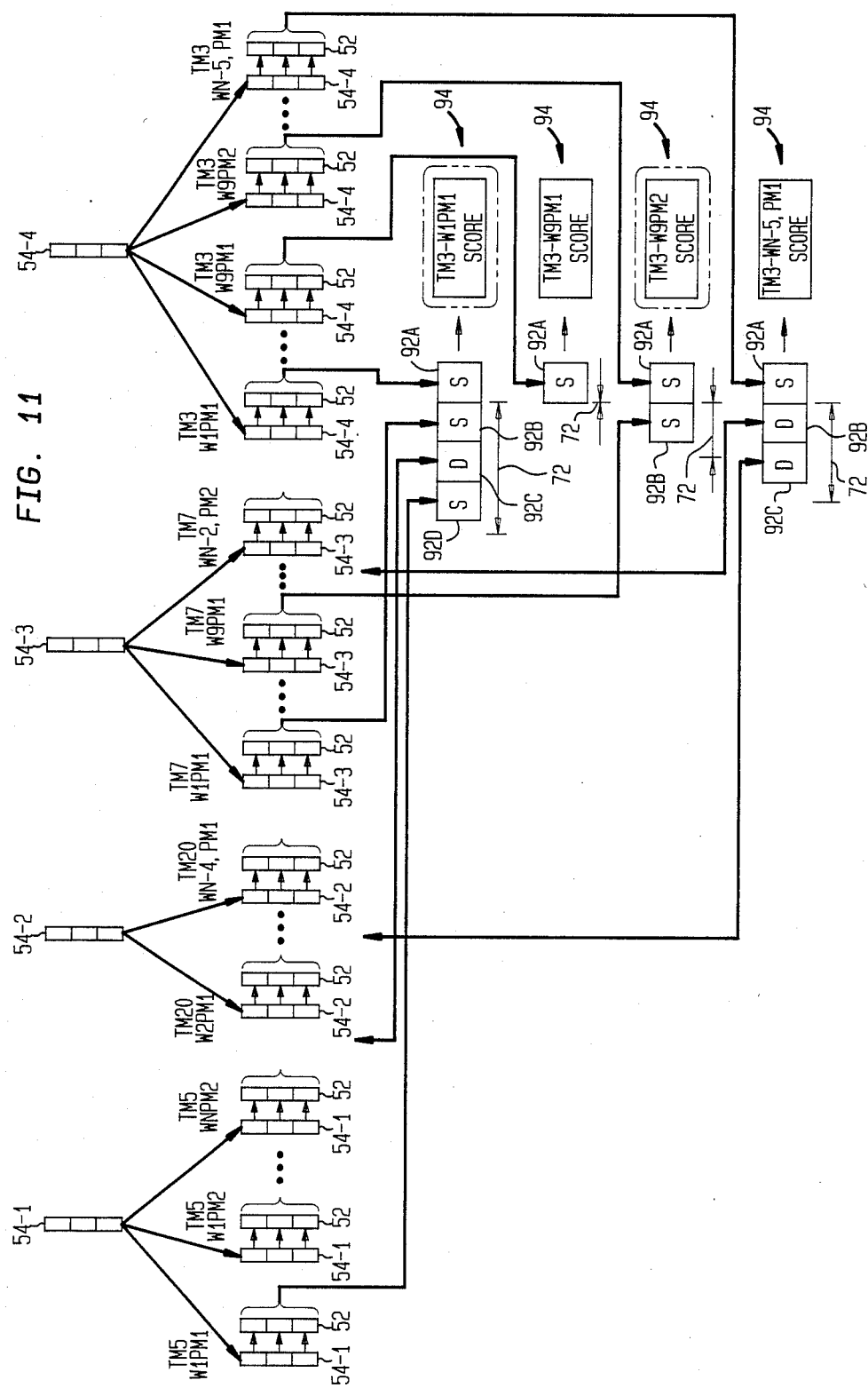
FIG. 11 is a schematic representation of how the time-aligned speech model associated with each match in the sequence of best scoring matches selected by the process of FIG. 10 is compared against each of the time-aligned pattern models associated with that speech model's time-aligning model, and how the partial scores resulting from similar comparisons for each of a succession of the best scoring time-aligned speech models are combined to calculate word scores associated with given portions of the speech signal.

Referring now to FIG. 11, once the most recent of a sequence of best scoring time-aligned speech vectors has been selected by the method of FIG. 10, the method shown in FIG. 11 is used to determine what words are candidates for a more thorough comparison against the speech signal near that speech vector's portion of the speech signal. In FIG. 11, it is assumed that the time-aligned speech vector 54-4 is the most recent speech vector selected by the process shown in FIG. 10. As a result, the speech vector 54-4 is compared against each of the time-aligned pattern models formed by the method of FIG. 7 in conjunction with that speech vector's associated best scoring time-aligning model 50-4. For purposes of the examples shown in FIG. 11, it is assumed that this is the time-aligning model TM3, whose row is shown in FIG. 8.

Since the time-aligned speech vector 54-4 and each of the time-aligned pattern models 52 against which it is compared by the method of FIG. 11 have been created by time alignment against the same time-aligning model, TM3, they all have been time aligned to a common standard, and thus, differences between the rate at which the speech represented by the speech vector and the speech represented by the pattern models are spoken is largely compensated for. At recognition time, this results in a great savings in computation, since all of the time-aligned pattern models have been created prior to recognition time, and thus the only time alignment required for the comparison between speech vectors and pattern models is that used to create the speech vectors.

Each comparison between the most recent, best scoring time-aligned speech vector 54-4 and a time-aligned pattern model 52 results in a partial score 92-A. This score is calculated as a function of the likelihood that the 24-parameter vector represented by the speech vector would be generated according to the 24-dimensional probability distribution represented by each such pattern model 52. The partial scoring 92-A calculated for each pattern model associated with the current best scoring time-aligning model TM3 provides a partial indication of the probability that the pattern model's associated word occurs at the portion of speech which gave rise to the current best scoring speech vector 54-4. But each such score is usually only partial, since it is calculated from a pattern model which normally only represents a relatively short portion of its associated vocabulary word.

In order to derive more accurate indications of the probability of a given word occurring in the vicinity of the current best scoring speech vector's location in the speech, scores associated with the prior best scoring time-aligned speech vectors can be used. This is done by a process which takes the length of time represented by the variable 72 calculated by the process of FIG. 7 in association with the time-aligned pattern model associated with each of the partial scores 92-A. This time value 72 indicates the average number of frames between the occurrence of the speech associated with that pattern model and the beginning of the word in which that pattern model occurs. If the time value 72 is 0, it indicates that the given pattern model occurs at the start of its associated word, and thus, that there is no prior speech from which to determine additional partial word scores. If on the other hand, a time value 72 has a length longer than the match associated with one or more of the prior best scoring speech vectors, then the method of FIG. 11 uses those one or more prior best scoring time-aligned speech vectors to calculate additional partial word scores 92-B, 92-C,..., as is shown in FIG. 11.

In FIG. 11, it is assumed that the first pattern model associated with the word W1 and the time-aligning model TM3, that labeled TM3-W1PM1 had associated with it an average time value 72 which is longer than the preceding three best scoring speech vectors. As a result, the process of FIG. 11 calculates a partial score 92-B, 92-C, and 92-D, respectively, in association with each of these three speech vectors by comparing its associated best scoring time-aligned speech vector 54-3, 54-2, and 54-1, respectively, against the pattern models formed by time alignment between the time-aligning model associated with each of those best scoring speech vectors and the word for which the partial word score is being calculated, which in this instance is word W1.

Where a given word has more than one pattern model for a given time-aligned model associated with a given prior best scoring speech vector (such as the pattern models TM5-W1PM1 and TM5-W1PM2 shown in FIG. 11), the pattern model which scores best against that speech vector has its resulting score against that speech vector used as the partial score calculated for that best scoring speech vector. If there is no pattern model associated with the given word and the time-aligning model associated with a given best scoring speech vector, then a default value, indicated by the value D in FIG. 11, is used as a partial score.

In the example of FIG. 11, the partial scores 92-A through 92-D used to calculate the word score TM3-W1PM1 include the partial score 92-A calculated by comparing the best scoring speech vector 54-4 against the first pattern model PM1 associated with word W1 and time-aligning model TM3; a partial score 92-B calculated by scoring the speech vector 54-3 against the first pattern model PM1 associated with word W1 and the time-aligning model TM7 associated with that speech vector; a partial score 92-C, which is a default score, since the example of FIG. 11 assumes there is no pattern model for both word W1 and time-aligning model TM20 associated with the best scoring speech vector 54-2; and a partial score 92-D derived from the score formed by comparing the best scoring speech vector 54-1 with the pattern model PM1 for the word W1 and the time-aligning model TM5 associated with the best scoring speech vector 54-1.

In the preferred embodiment, all of these scores, 92-A through 92-D are represented as logarithms of probabilities of the match between their corresponding speech vector and pattern models. Since this is the case, these logarithms can be added to derive a value which indicates the product of their corresponding probabilities. Preferably, this total score is then normalized to reflect the percent of the word which precedes or is included in the pattern model used to calculate the last partial score in that total word score. This percentage can be calculated when performing the functions described above with regard FIG. 7, by determining, when calculating each pattern model, the percent of each utterance used to calculate that pattern model which precedes, or is included in, the last frame time aligned against that pattern model. Such a normalization technique should, for example, effectively leave the probability represented by the sum of the partial scores 92 unchanged if they represent 100 percent of the word, and should divide that probability in half if the partial scores represent only half of the individual word.

Once total word scores 94 have been calculated in association with each of the partial scores 92 calculated for the most recent best scoring speech vector 54-4, those word scores 94 with a value better than a given threshold are selected, as is indicated by the dotted lines around two of those scores in FIG. 11.

Referring now to FIG. 12, once the better than threshold word scores 94 have been selected for the most recent best scoring speech vector 54-4, a range of start times is calculated for each word associated with each of those scores. These start times are calculated back from the first frame 102 of the match against the time-aligning model TM3 associated with the most recent best scoring speech vector 54-4. The width of the range, or window, 104 of start times associated with each such selected word score is calculated as a function of the variation value 74 calculated according to the method of FIG. 7 in conjunction with the pattern model used to calculate the most recent partial score 92-A used to calculate the selected word's word score 94. The length 106 by which the middle of each such window extends back from the frame 102 is determined by the time value 72 calculated in association with that same pattern model.

FIG. 12 only shows windows 104 calculated in association with the most recent best scoring speech vector 54-4. In actuality such start time windows are calculated for each of the successive best scoring speech vectors 54.

The speech recognition system of the preferred embodiment uses dynamic programming to provide a computationally intensive comparison between the speech signal 78 and the node-based word models 105A which have been derived according to the method of FIG. 4 for each of a plurality of candidate words. As is known in the art of dynamic programming, dynamic programming can be used to provide an endscore, that is, a score which indicates the probability that a match has occurred between a given node-based word model 105A and a given section of speech which ends at a given frame 108. According to the preferred embodiment, anytime such an endscore 110 is produced for a given word model at given frame 108 which is better than a certain threshold value, that word score is combined with any other better than threshold endscores 110 produced for other word models at that same frame to produce a combined endscore 112. The endscores 110 for each frame should be combined in a manner which causes the combined endscore 112 for that frame to represent the sum of the probabilities that one or more matches between word models and the speech ended at that frame.

For every frame, such as the frame 108 shown in FIG. 12, in which one or more word models have better than threshold endscores, the method of FIG. 12 selects all the words having word start windows 104 which overlap the following frame 109 as candidates for dynamic programming starting at the frame 109. In FIG. 12 the words W9 and word WX are shown as being examples of such word candidates for the frame 109. The method of FIG. 12 then causes dynamic programming against the word model 105B corresponding to each of the candidate words for a given frame to be seeded with a seed score 111 equal to the combined endscore 112 created for that frame.

As those skilled in dynamic programming will understand, when dynamic programming of a word is seeded with a given score at a given frame 109, the seed score represents the probability that the frame is an appropriate location for the word model to start a match against the speech, based on information from previous frames. The seed score is used as the initial score for the dynamic programming match between each candidate word model 105B and the portion of speech starting with that seed score's associated frame 109. Since the method of the present invention seeds, or starts, the dynamic programming of a given word at a given frame with a score which reflects the probability that one or more other words have ended at that frame, the method tends to give the best dynamic programming scores to words whose start times match the ending times of previous words. This is desirable for a continuous speech recognition system, since, in continuous speech, most words follow immediately after a preceding word.

The above mentioned U.S. patent application Ser. No. 797,249 contains a much more detailed description of a dynamic programming algorithm which is basically similar to that for use with the above invention, except that in that prior application a different form of prefiltering is used and the first node of each word model is seeded as a function of likelihood that the current frame was preceded by silence. As those skilled in dynamic programming will understand, thresholding can be used at each frame of the speech to remove from further dynamic programming those word candidates which have dynamic programming scores worse than a certain threshold. This greatly reduces computation by eliminating the dynamic programming against words which appear to have a low probability of matching a given portion of the speech.

It can be seen that the present invention provides a speech recognition method which reduces the amount of computation required to achieve a given degree of speech recognition performance. It does this by reducing the number of words for which dynamic programming is seeded at each frame to a relatively small subset of the system's vocabulary, that is, the subset of words which have word start window overlapping each such frame. The method also reduces computation by the fact that it does not go through the entire process of calculating word candidates separately for each frame or each possible word ending time. Instead it selects word candidates and their associated windows of start times, relatively independently of the dynamic programming process which performs the computationally intensive comparison between word candidates and the speech, and then for each frame at which the dynamic programming indicates a word has possibly ended, it selects as candidates for new words those words whose windows overlap that frame.

It can also be seen that the invention provides a speech recognition method which compares a sequence of sounds to be recognized against each of a plurality of speech pattern models, and which effectively compensates such comparisons for variations in the speed at which the speech is spoken without requiring the time warping of that sequence against each of the pattern model against which it is compared. In the preferred embodiment, this is performed by time aligning both the speech to be recognized and speech patterns against a common time-aligning model and then comparing the resulting time-aligned speech models and time-aligned pattern models. It should be understood, however, that in alternate embodiments of the invention this method can be used in the comparison of other types of speech units, such as the comparison of speech to be recognized against models of complete vocabulary words. It also should be understood that in alternate embodiments this aspect of the invention can be used as the main recognition comparison of a speech recognition system.

In the description above, the acoustic descriptions of the speech to be recognized and of the utterances from which the time-aligned pattern models are derived are all frames comprising eight basically spectral parameters. It should be understood that in other embodiments of the invention a different number of spectral parameters, or parameters other than spectral parameters, can be used. For example, frames comprised of linear predictive coding parameters can be used with the present invention.

In the description above, the probability distributions used in the pattern models, time-aligning models, and word models are all Laplacian distributions, each dimension of which is defined by a mu, or means, and a sigma, or absolute deviation. It should be understood that other types of probability distributions can be used with the present invention, such as probability distributions which use other measures of central tendency besides means, and other measures of spread besides the absolute deviations.

In the preceding text and in the claims that follow, the phrase "dynamic programming" has been used to broadly include all methods used in the art of speech processing for optimally time aligning a sequence of frames against a sequence of nodes or arcs. The phrase is meant to include both the Viterbi algorithm and the Baum-Welch algorithm, even though some purists consider the Baum-Welch algorithm to be a "dynamic programming-like" rather than actual dynamic programming algorithm.

Accordingly, the present invention should not be considered to be limited by the description herein of the preferred embodiment, but rather should be interpreted in accordance with the following claims.

What we claim is:

1. A method of determining the probability that a given portion of speech to be recognized corresponds to a speech pattern, representing a common sound sequence occurring in one or more words, the method comprising:

time aligning a series of acoustic descriptions representing the speech to be recognized against a time-aligning model comprised of a series of acoustic sub-models;

deriving a time-aligned speech model having a series of acoustic sub-models, each of which is derived from the acoustic speech descriptions time aligned against a corresponding sub-model of the time-aligning model;

providing time-aligned acoustic models of each of a first class of speech patterns, each of which time-aligned pattern models is derived by:
   time aligning a series of acoustic descriptions from one or more utterances of that speech pattern against the time-aligning model, and
   deriving, for that pattern model, a series of acoustic sub-models, each of which is derived from the acoustic descriptions from those one or more utterances time aligned against a corresponding sub-model of the time-aligning model;

comparing the time-aligned speech model against each of a plurality of the time-aligned pattern models so as to produce a score for each such comparison as a function of how closely each sub-model of the speech model compares to its corresponding sub-model of a given pattern model;

selecting which speech patterns warrant a more computationally intensive comparison against the speech to be recognized in response to the scores produced for the comparisons between the speech model and the pattern models; and performing that more computationally intensive comparison for the selected speech patterns in order to determine which of the selected speech patterns most probably corresponds to said speech to be recognized.

2. A method as described in claim 1, which further includes:

selecting which speech patterns warrant a computationally intensive comparison against the speech in response to the scores produced for the comparisons between the speech model and the pattern models; and performing that more computationally intensive comparison for the selected speech patterns.

3. A method as described in claim 2, wherein:

the first class of speech patterns, those for which time-aligned pattern models are provided, represent sound sequences contained in individual vocabulary words which are shorter in length than most of the vocabulary words of which they are part; and the selected speech patterns for which the more computationally intensive comparison is performed represent entire vocabulary words.

4. A method as described in claim 1, wherein there are a plurality of time-aligning models, each with a series of sub-models;

the time aligning of the acoustic speech descriptions is performed against each of a plurality of the time-aligning models; and the providing of time-aligned pattern models includes providing, for a given speech pattern, a plurality of time-aligned pattern models which are derived by time aligning acoustic descriptions of one or more utterances of that speech pattern against each of a plurality of time-aligning models.

5. A method as described in claim 4, further including providing time-aligning models which have been prepared by the following process:

using dynamic programming to divide the series of acoustic descriptions of one or more utterances of each of a plurality of speech sequences into series of corresponding segments;

deriving a model of each such speech sequence, which speech sequence pattern model has a series of sub-models, each of which is derived from the acoustic descriptions included in a group of corresponding segments produced by the dynamic programming from the one or more utterances of that speech sequence;

dividing the speech sequence models into clusters of similar models;

deriving an acoustic cluster model for each such cluster, which model has a series of sub-models corresponding to the series of sub-models of the speech sequence models placed within its corresponding cluster; and using the resulting cluster models as time-aligning models.

6. A method as described in claim 5, wherein:

the using of dynamic programming in the preparation of time-aligning models includes using dynamic programming to segment the acoustic descriptions of one or more utterances of each of a plurality of vocabulary word into series of corresponding segments;

each speech sequence model is derived from N sequential groups of corresponding segments produced by the dynamic programming of a given vocabulary word, and each such speech sequence model has N sub-models, each derived from the acoustic descriptions associated with one of those N groups of sequential segments;

the cluster models each have N sub-models, each of which is derived from a corresponding one of the N sub-models of each of the speech sequence models grouped into the cluster model's associated cluster; and the time-aligned pattern models are produced by time aligning portions of individual vocabulary words against individual time-aligning models to produce time-aligned pattern models each having N sub-models.

7. A method as described in claim 6, some vocabulary words have different time-aligned pattern models associated with their successive parts.

8. A method as described in claim 6, wherein:

each of the acoustic descriptions in the series of acoustic descriptions of the speech to be recognized and of the utterance of the speech patterns contains M parameter values;

each of the N sub-models of each time-aligning models has an M dimensional probability distribution, each dimension of which corresponds to one of the parameter values of the acoustic descriptions;

each of the time-aligned pattern models comprises an N x M dimensional probability distribution, each dimension of which is derived from the values for a given one of the M parameters of the acoustic descriptions from one or more utterances of the model's speech pattern which have been time aligned against a given one of the N sub-models of a time-aligning model;

each of the time-aligned speech models comprises a corresponding N x M dimensional vector of parameter values, each dimension of which represents the values of a given one of the M parameters over that portion of the speech descriptions time aligned against a given one of the N sub-models of a time-aligning model; and the score produced for the comparison of a time-aligned speech model and a time-aligned pattern model which have been time aligned against the same time-aligning model is a likelihood score representing the probability of the parameter vectors of the speech model being generated by the probability distribution of the pattern model.

9. A method as described in claim 4, wherein:

the time aligning of the speech descriptions against each of a plurality of time-aligning models includes:

deriving a score indicating the closeness of that speech to each such time-aligning models; and selecting the time-aligning model which has the best, or closest, score against the acoustic description of speech; and the comparing of the time-aligned speech model against a plurality of time-aligned patterns models is performed for the speech model and the pattern models produced by time alignment against the same best scoring time-alignment model.

10. A method as described in claim 9, wherein:

the time aligning of the speech descriptions against each of a plurality of time-aligning models includes using dynamic programming to:

compare each of those time-aligning models against the entire length of a series of acoustic descriptions representing a segment of speech longer than that associated with individual speech patterns of the first class;

determine when a given time-aligning model matches a given portion of this series of speech descriptions with at least a given degree of closeness;

produce a time-aligned speech model for the matching portion of speech against the matching time-aligning model; and produce a score indicating the closeness of the match between the matching portion of speech and the matching time-aligning model;

the selecting of the time-aligning model which has the best score is done repeatedly so as to produce a series of such best scoring time-aligning models each associated with successive portions of the series of speech description; and the comparing of the time-aligned speech model against the time-aligned pattern models is performed separately in association each of the series of best scoring time-aligning model.

11. A method as described in claim 10, wherein:

individual speech patterns of the first class represent speech sounds associated with individual vocabulary words;

the method further includes calculating a word score for a given vocabulary word at a given location in the series of speech descriptions, which calculation includes:

basing the calculation on one or more of the series of best scoring time-aligning models;

for each such best scoring model, taking the speech model produced by time alignment with it and a pattern model associated with the vocabulary word produced by time alignment with it, and calculating a partial score based on the closeness of the match between that speech model and that pattern model; and combining the resulting partial scores calculated for each such best scoring model to produce the word score.

12. A method as described in claim 11, wherein the number of such best scoring time-aligning models for which partial scores are derived and used to calculate the word score for a given word is determined by the length of speech, in previous utterances of the word, between the beginning of the given word and sounds corresponding the last of the best scoring time-aligning models used to calculate the word score.

13. A method as described in claim 11, wherein the word scores produced for various locations along the series of speech descriptions are used to select which words warrant a more computationally intensive comparison against those locations.

14. A method of recognizing continuous speech comprising:

providing a plurality of acoustic cluster models, each of which includes a series of acoustic sub-models, said cluster models being derived by using dynamic programming to divide one or more utterances of each of a plurality of vocabulary words into series of corresponding segments;

deriving a series of sub-models for each such word, with each sub-model representing a group of corresponding segments from the one or more utterances of that word;

dividing the series of sub-models from the different words into clusters of relatively similar series; and calculating a model for each such cluster which reflects the series of sub-models which have been grouped into that cluster;

performing a comparison between a portion of the speech to be recognized and each of a plurality of the cluster models, selecting the one or more cluster models against which the portion of speech compares most closely; and performing further comparison between that portion of speech and the words whose series of sub-models have been associated with the one or more selected cluster models against which that portion of speech compares most closely.

15. A method of recognizing continuous speech comprising:
    scanning a temporal acoustic representation of the speech for the occurrence of acoustic patterns, each of which occurs in one or more individual vocabulary words;
    when such patterns are detected in the speech representation, calculating a range of start times in the representation at which it is most likely each of the one or more vocabulary words associated with that pattern started;
    performing a computationally intensive comparison between a portion of the speech representation and each of a plurality of vocabulary words, including determining when there is a probability better than a given threshold that a match of a given vocabulary word against the speech representation has terminated at a given ending time in that representation, wherein said computationally intensive comparison between a given vocabulary word and a given portion of speech is more computationally intense than the scanning of that portion of speech for the occurrence of a given acoustic pattern; and
    using those vocabulary words which have a range of start times which overlaps the given ending time as words against which to perform said intensive comparisons, starting approximately at the given ending time.

16. A method as described in claim 15, wherein:
    the performing of said computationally intensive comparisons includes performing dynamic programming between the speech representation and each of the plurality of vocabulary words; and
    the using of those vocabulary words which have an overlapping range of start times includes seeding the dynamic programming of all those vocabulary words approximately at the given ending time.

17. A method as described in claim 16, wherein:
    the dynamic programming includes generating endscores at successive times in the speech representation, each of which indicates the probability that the match of a given vocabulary word against the speech representation ends at that endscore's time; and
    the determining of when there is a probability better than a given threshold that the intensive comparison between the speech representation and a vocabulary word has ended is performed by determining when the endscore for the given word is better than a given threshold.

18. A method as in claim 17, wherein:
    the initial score of the dynamic programming of the vocabulary words having overlapping range of start times is calculated as a function of a combination of the endscores at the given ending time.

19. A method as in claim 15, wherein:
    the calculating of a range of start times includes calculating back from the time in the speech representation at which the pattern is detected by an amount derived by observations of the length of time, in previous utterances of the word, between the occurrence of that pattern and the beginning of the word.

20. A method as described in claim 19, wherein:
    the calculating of a range of start times further includes calculating the width of that range as a function of the amount of variation observed, in previous utterances of the word, between the occurrence of that pattern and the beginning of the word.

* * * * *